United States Patent [19]

Fujikawa et al.

[11] Patent Number: 5,147,086
[45] Date of Patent: Sep. 15, 1992

[54] PREPARATION OF CAPSULE FOR USE IN ISOSTATIC PRESSING TREATMENT

[75] Inventors: Takao Fujikawa, Kobe; Yasuo Manabe, Osaka; Kazuhiko Nakajima, Kabe, all of Japan

[73] Assignee: Kabushiki Kaisha Kobe Seiko Sho, Kobe, Japan

[21] Appl. No.: 683,732

[22] Filed: Apr. 11, 1991

[30] Foreign Application Priority Data

Aug. 8, 1990 [JP] Japan .................................. 2-210635

[51] Int. Cl.⁵ ............................................ B23K 35/24
[52] U.S. Cl. .................................. 228/243; 228/186; 228/265; 419/49
[58] Field of Search ....................... 228/186, 243, 265; 419/49

[56] References Cited

U.S. PATENT DOCUMENTS

| | | |
|---|---|---|
| 3,340,053 | 9/1967 | Hodge et al. |
| 3,577,635 | 5/1971 | Bergman ............................ 419/49 X |
| 3,936,277 | 2/1976 | Jakway et al. ................... 228/155 X |
| 4,150,775 | 4/1979 | Roden et al. ........................... 228/50 |
| 4,383,809 | 5/1983 | Hoffmüller ......................... 419/49 X |
| 4,435,360 | 3/1984 | Trottier et al. ........................ 419/49 |
| 4,772,293 | 9/1988 | Bugden et al. .................. 228/179 X |
| 4,995,549 | 2/1991 | Hellman, Sr. ....................... 228/147 |

FOREIGN PATENT DOCUMENTS

| | | | |
|---|---|---|---|
| 0060167 | 9/1982 | European Pat. Off. .............. 419/49 |
| 0003602 | 1/1981 | Japan ..................................... 419/49 |
| 7500353 | 7/1975 | Netherlands ........................... 419/49 |

Primary Examiner—Richard K. Seidel
Assistant Examiner—Patty E. Hong
Attorney, Agent, or Firm—Oblon, Spivak, McClelland, Maier & Neustadt

[57] ABSTRACT

A process for preparation of capsule for use in isostatic pressing treatment, the process comprising a first step of enclosing a material to be treated, such as ceramic, metal, resin, etc. with metallic foil having a thickness of from 30 to 300 μm, and a second step of welding the metallic foil so as to seal the material to be treated in the metallic foil thus welded, thereby preparing a capsule, wherein the welding is carried out by means of TIG welding. Alternatively, the welding may be carried out by means of seam resistance welding. It is posible, by the process, to seal the material to be treated in a capsule easily and economically. The capsule thus obtained is in a good sealed condition, permits effective isostatic pressing treatment, and enables the treated material to be taken out easily. A ceramic or metal layer covers the material to be treated to prevent adhesion between the material and the metallic foil.

6 Claims, 7 Drawing Sheets

PREPARATION OF CAPSULE FOR USE IN ISOSTATIC PRESSING TREATMENT

BACKGROUND OF THE INVENTION

(1) Field of the Invention

This invention relates to a process for preparation of capsule for use in isostatic pressing treatment, such as the hot isostatic pressing process (HIP process) and the warm isostatic pressing process (WIP process), which are utilized for producing a sintered body of high density through exerting a high hydraulic pressure on a material to be treated, such as a molded powder body of ceramic, metal, resin or the like, at high temperature, or utilized for diffusion joining of two or more different materials through exerting a high hydraulic pressure on the materials at high temperature.

(2) Description of the Prior Art

The HIP and WIP processes, in which compression molding is carried out by using a fluid having a high pressure of from several hundreds to several thousands of kilograms-force per square centimeters ($kgf/cm^2$) as a pressure medium at high temperature, have been rapidly coming into increasingly wider use in recent years as a technique for sintering of difficultly processible powder materials into high-density products or as a technique for solid phase diffusion joining, because the processes provide high working pressures and enable isostatic compression.

The HIP process uses a high-pressure gas as a pressure medium and, therefore, makes it possible to generate a high temperature of 2000° C. or above. On the other hand, the WIP process employs a heat-resistant oil or the like, and permits the use of temperatures up to about 300° C. at most.

In the case of sintering a powder material into a high-density mass or performing solid phase diffusion joining, both the above two processes require a pretreatment for covering the entire surface of the material to be treated by a gas-impermeable material so as to prevent the penetration of the pressure medium into the material being treated.

As a method for the pretreatment, a method in which the material to be treated, comprising a powder material or the like, is sealed in a metallic container, or capsule, in a vacuum condition, as for example disclosed in Japanese Patent Application Laid-Open (KOKAI) No. 47-16308 (1972) or 57-116702 (1982).

Figure 11:
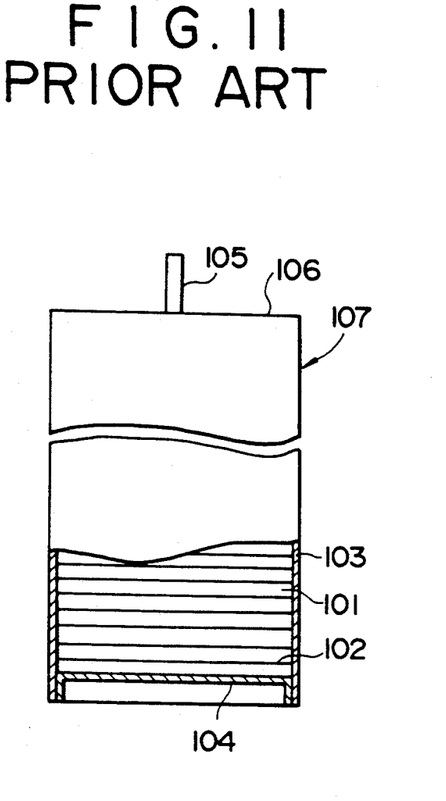
FIGS. 11 and 12 are each a sectional view showing a process according to the prior art.

According to the technique disclosed in the Japanese Patent Application Laid-Open (KOKAI) No. 47-16308 (1972), as shown in FIG. 11 an alternate stack of plate-like materials 101 to be treated and metallic foils 102 is sealed in a metallic capsule 107 comprising a pipe member 103, a bottom portion 104 and a cap 106 having a vacuum pipe 105. The pipe member 103, bottom portion 104 and the cap 106 are welded to each other. After evacuation of the welded assembly through the vacuum pipe 105, the pipe 105 is mechanically compressed to seal up the pipe 105, and then the pipe 105 is cut off at the sealed portion. Finally, the cut portion of the vacuum pipe 105 is sealed up by welding, fusion bonding or the like to prepare a capsule 107 in which the materials 101 to be treated are contained in the evacuated condition.

The capsule 107 thus prepared is fed into a furnace of an HIP device, to be subjected to an HIP treatment under predetermined conditions. Then, the capsule 107 is removed, and the foils 102 are taken away, to obtain plate-like sintered products.

Figure 12:
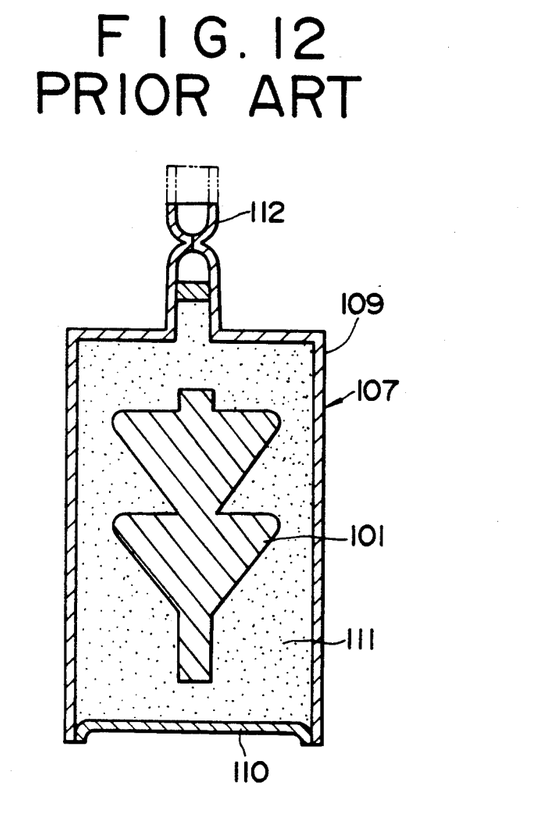

According to the technique disclosed in the Japanese Patent Application Laid-Open (KOKAI) No. 57-116702 (1982), as shown in FIG. 12 a material 101 to be treated is placed in a metallic capsule 107 comprising a pipe member 109, a lower cap 110 and the like, and the space between the material 101 and the capsule 107 is filled up with powder particles 111 having fluidity. The capsule 107 is evacuated through a pipe 112, and an intermediate portion of the pipe 112 is hermetically closed for sealing, followed by an HIP treatment.

Problems to be Solved by the Invention

However, the metallic capsules of the conventional structure, produced by welding blank materials formed of pipe or plate materials having a thin material thickness, are high in stiffness of their own and have the following drawbacks.

Figure 13:
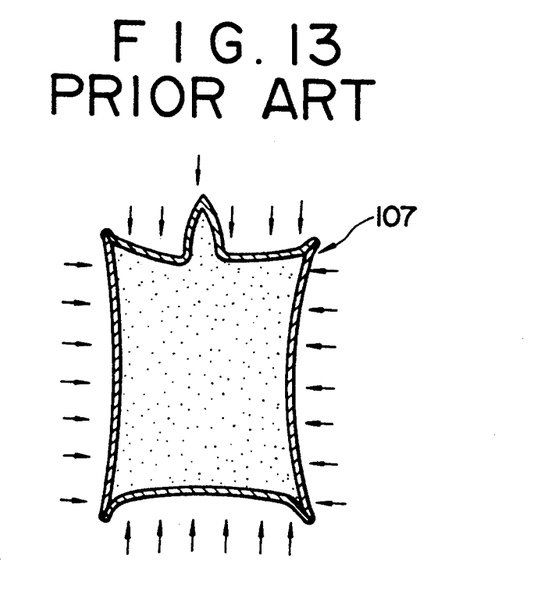
FIG. 13 is an illustration of a deformed condition of a capsule prepared according to the prior art.

Due to the high stiffness of the capsules having the conventional structure, the capsules show comparatively high resistance to plastic deformation, even at high temperatures. As shown in FIG. 13, therefore, such a capsule 107 has the drawback of shrinking into an hourglass-like overall shape during an HIP treatment. Consequently, in the case of a material to be treated having a small thickness of about 1 mm, the deformation into an hourglass-like shape makes it difficult to secure planeness.

Besides, in sealing the material to be treated in a capsule according to the prior art, it has been necessary to make accurate the inside diameter of the capsule in order to securely provide a predetermined spacing between the outer peripheral surface of the material to be treated and the inner peripheral surface of the capsule. It has therefore been required to determine the dimensions of the capsule in accordance with the respective dimensions of a given material to be treated, and such a process is troublesome and is poor in productivity.

On the other hand, the process in which powder particles are used to fill up the space between the material to be treated and the capsule involves extra need for the powder particles and necessitates the step of charging the powder particles into the space. At the time of evacuation of the capsule, furthermore, it is necessary to apply a means for preventing the powder particles from being sucked out. In these points, the process has difficulties as to productivity.

In addition, the conventional processes uses a system in which a portion of the stiff pipe used for evacuation is compressed, then once cut and thereafter sealed up by welding, fusion bonding or the like. According to the system it is difficult to obtain a favorably sealed condition, and the capsule obtained lacks in sealing quality and has poor degree of vacuum.

For removal of the capsule after the HIP treatment, furthermore, it is necessary to adopt a method of grinding off the capsule by a lathe or a method of dissolving the capsule in a strong acid, because of the high stiffness of the capsule itself. Removal of the capsule by such a method takes much time, is poor in productivity and unsuitable for mass treatment of small-sized molded bodies.

SUMMARY OF THE INVENTION

It is accordingly an object of this invention to provide a process for preparation of capsule for use in isostatic pressing treatment by which good sealing qualities can be obtained, which enables preparation of a sheet-like molded bodies and which, with good productivity, is suitable for mass treatment of small-sized molded bodies.

One of technical means provided by this invention for attaining the above-mentioned object resides in a process for preparation of capsule for use in isostatic pressing treatment, the process comprising:

a first step of inserting a material to be treated into an existing metallic foil having a thickness of from 30 to 300 μm, the material being a ceramic, metal, resin or the like; and a second step of welding the metallic foil so as to seal the material to be treated in the metallic foil thus welded, thereby preparing a capsule, the welding being carried out by means of TIG welding.

Another technical means according to this invention resides in a process in which the welding in the just mentioned process is carried out by means of seam resistance welding.

According to this invention, a bag-shaped body 1A having a feed port 3 is formed of a metallic foil 2 having a thickness of 30 to 300 μm. Therefore, when a material 6 to be treated is placed in the inside of the metallic foil 2 and the bag-shaped body 1A is evacuated, the metallic foil 2 constituting the bag-shaped body 1A is deformed easily into a shape conforming to the outer surfaces of the material 6 to be treated, so that the evacuation can be performed efficiently.

After the evacuation, the material 6 to be treated and a pipe 7 for evacuation are subjected to lap welding 11. The welding is carried out under the evacuated condition, so that a favorable degree of vacuum is attained inside the bag-shaped body 1A after sealing. In addition, opposed portions of the metallic foil 2 are brought into contact with each other by the evacuation, so that the welding 11 is achieved easily and a capsule 1 in a favorable sealed condition can be obtained.

Figure 5:
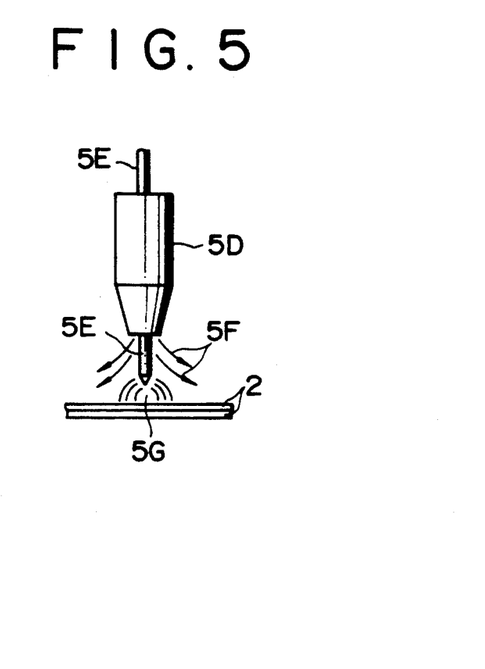
FIG. 5 is an illustration of TIG welding.
Figure 6:
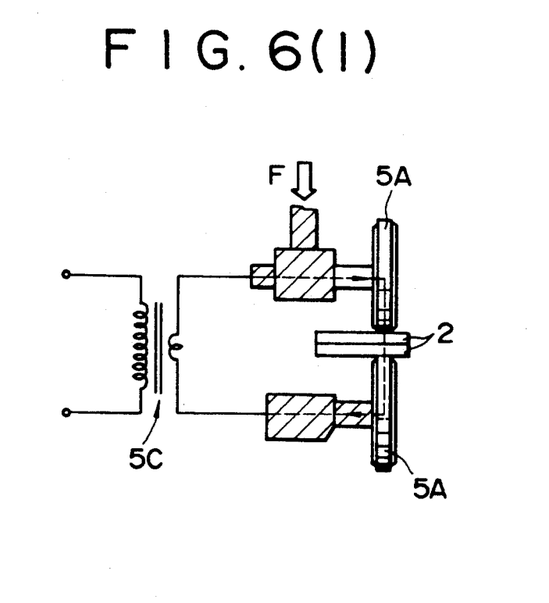

The lap welding 11, in this invention according to claim 1, is carried out by the so-called TIG (tungsten inert gas welding), one of gas shield arc welding techniques, in which welding is carried out in a protective gas atmosphere comprising argon, helium or a mixed gas thereof by use of a tungsten electrode 5E, as shown in FIG. 5. It is thereby possible to achieve the lap welding 11 more economically than by YAG laser welding or light beam welding.

In this invention according to claim 2, the lap welding 11 is carried out by seam resistance welding in which, as shown in FIGS. 6(1) and 6(2), metallic foils 2 are clamped between a pair of copper alloy rollers 5A and 5A, and spot welding is repeated to obtain a continuous weld. This process is more economical than the processes employing YAG laser welding or light beam welding. In addition, the clamping of the metallic foils 2 between the copper alloy rollers 5A, 5A eliminates the need for special clamping jigs.

When the capsule 1 prepared as above is pressed by an isostatic pressing system, the capsule 1 itself shows very low stiffness, so that the isostatic pressing treatment of the material 6 to be treated can be performed effectively.

Furthermore, the material 6 after the isostatic pressing treatment can be easily taken out of the capsule 1 by cutting the capsule 1 at an appropriate position, because the capsule 1 is formed of the thin metallic foil 2.

The above and other objects, features and advantages of this invention will become apparent from the following description and appended claims, taken in conjunction with the accompanying drawings which show by way of example some preferred embodiments of this invention.

BRIEF DESCRIPTION OF THE DRAWINGS

FIGS. 2(1) and 2(2) are perspective views respectively showing two examples of material to be treated in their state of being contained in a bag-shaped body;

FIG. 2(3) is a partly enlarged view of FIG. 2(2);

FIGS. 3(1) and 3(2) are perspective views respectively illustrating two examples of evacuation;

FIGS. 6(1) and 6(2) are each an illustration of seam resistance welding;

DESCRIPTION OF PREFERRED EMBODIMENTS

Some preferred embodiments of this invention will now be described below with reference to the drawings.

Figure 1:
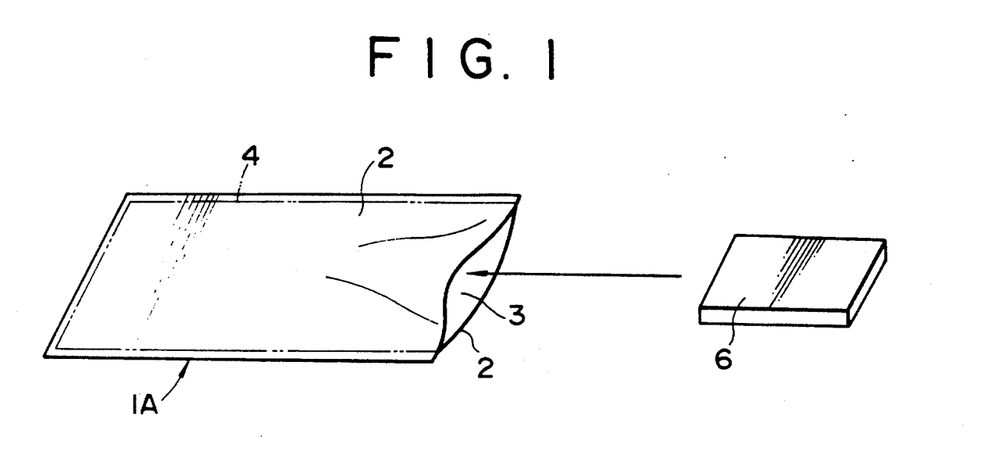
FIG. 1 is a perspective view showing a bag-shaped body and a material to be treated, for use in one embodiment of this invention.
Figure 2:
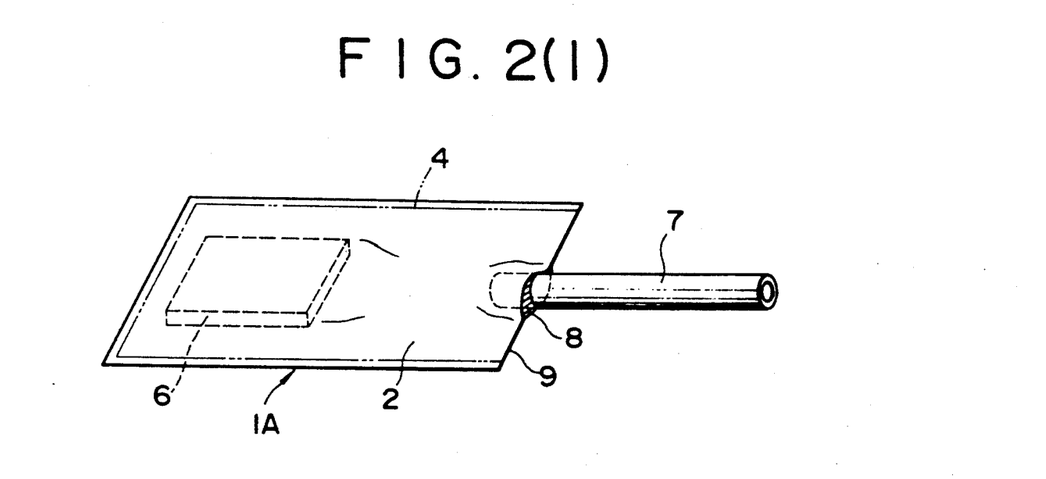
Figure 3:
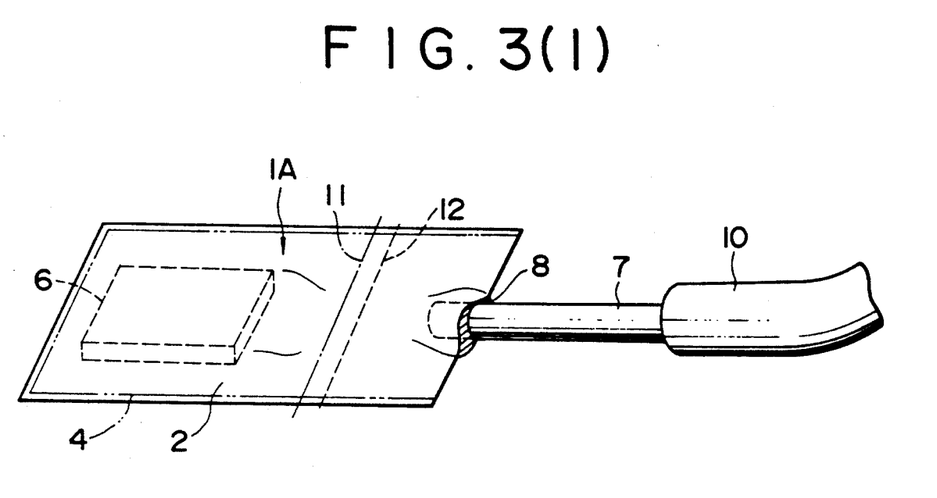

Referring first to FIG. 1, there is shown a bag-shaped body 1A for preparing therefrom a metallic capsule for use in an HIP or WIP treatment. The bag-shaped body 1A is formed by placing a pair of rectangular metallic foils 2, one on the other, and subjecting the foils 2 to lap welding 4 along three edges of the rectangle, leaving the remaining one edge of the rectangle unwelded, to form a charge port 3. The material for the metallic foils 2 can be suitably selected taking into account the HIP or WIP treatment temperature and the reactivity of the foil material with the material to be treated. In order to overcome the drawbacks of the prior art more effectively, a softer material is preferred as the foil material. For instance, aluminum, lead, mild steel, stainless steel, copper, platinum, tantalum, molybdenum or the like may be used.

The material thickness of the metallic foil 2 for used in this invention is determined in consideration of the flexibility, plastic deformability, breaking strength, etc. of the material, and specifically from 30 to 300 μm.

If the thickness of the metallic foil 2 is less than 30 μm, the foil may have pinholes therein. In such a situation, gas-tight quality of the foil material itself may fail to be strictly secured. Further, the metallic foil 2 may be damaged or perforated upon being scratched slightly during transportation. Thus, a foil thickness of less than 30 μm is unsatisfactory for practical use.

When the foil thickness exceeds 300 μm, on the other hand, the metallic foil cannot be cut by a simple method, such as by a pair of scissors or shears. Further, the removal of the capsule after an HIP treatment cannot be carried out easily and requires the use of lathe or the like. Consequently, the merit of this invention is spoiled.

More specifically, it is recommendable that the metallic foil 2 have a thickness of 100 μm or below, which permits easy cutting of the foil 2, from the viewpoint of capsule removal after an HIP treatment. Sealing by the welding 4 is carried out by applying TIG welding or seam resistance welding.

Denoted by 6 is a material to be treated by HIP or WIP, which comprises a single material of ceramic, metal or resin or a composite material formed from two or more of these, or comprises two or more plate-like samples to be joined, or the like.

The material 6 to be treated is placed through the charge port 3 into the inside of the metallic foil 2 formed into the back-shaped body 1A. Thereafter, as shown in FIG. 2(1), a pipe 7 for evacuation is inserted into the bag-shaped body 1A through the charge port 3 used as an opening portion 9 for attaching the pipe 7. The opening portion is sealed gas-tight by an adhesive, an O-ring, soldering, welding 8 or the like.

The pipe 7 may be formed of either metal or resin, and the use of an adhesive based on an epoxy or other resin is simple and preferable. Where the pipe 7 is made of metal, however, soldering or welding may be employed for sealing the opening portion 9.

The position at which the pipe 7 for evacuation is to be attached is not limited to the charge port 3. It is also possible, as shown in FIGS. 2(2) and 2(3), to provide one of the metallic foils 2 with an opening portion 9 for permitting attachment of the pipe 7 thereto, then insert the pipe 7 into the opening portion 9, and seal the opening portion 9 gas-tight by an adhesive, an O-ring, soldering, welding 8 or the like. In this case, gas-tight property is maintained, after the material 6 to be treated is contained in the bag-shaped body 1A, either by sealing the charge port 3 through welding 4 in the same manner as in sealing the other three edges of the rectangle, or by mechanically clamping the upper and lower metallic foils 2 of the bag-shaped body 1A to each other.

Figure 4:
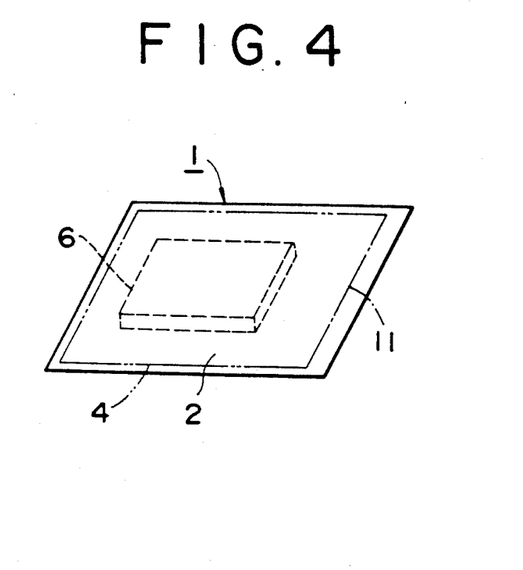
FIG. 4 is a perspective view of a capsule in which a material to be treated is sealed.
Figure 7:
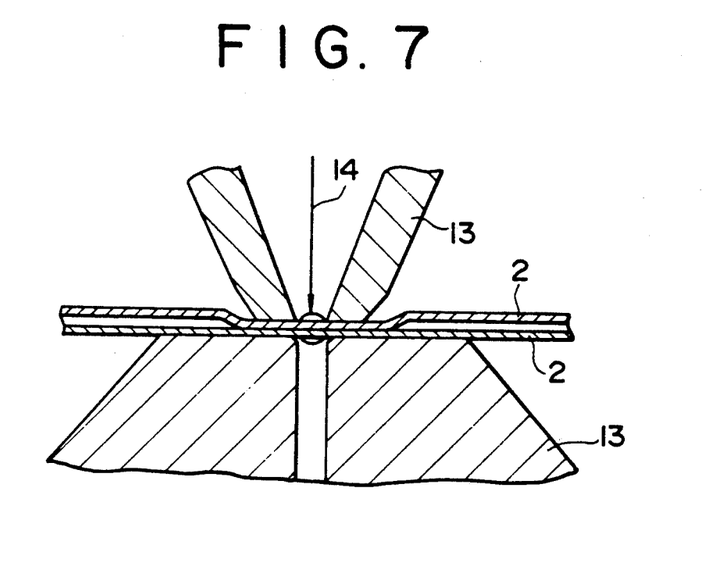
FIG. 7 is a sectional view showing the manner in which lap welding is carried out through using a clamp.

Next, as shown in FIGS. 3(1) and 3(2), a vacuum hose 10 of a vacuum pump or the like is connected to the pipe 7, and the bag-shaped body 1A is evacuated. After a predetermined degree of vacuum is reached, the evacuation by the vacuum pump or the like is continued while the upper and lower metallic foils 2 of the bag-shaped body 1A are subjected to lap welding 11 at a portion between the material 6 to be treated and the pipe 7, resulting in sealing. Then, the useless portion on the side of the pipe 7 is cut off 12 at an appropriate position by a pair of scissors or shears or the like, whereby a capsule 1 with the material 6 to be treated sealed therein is obtained, as shown in FIG. 4. The lap welding 11 after the evacuation may be carried out by application of TIG welding, seam resistance welding or the like. In order to obtain a gas-tight welded condition upon the lap welding 11, it is necessary to keep the overlapping metallic foils 2 in close contact so that the gap therebetween is not more than 1/10 times the thickness of the foil 2. Besides, wrinkling of the metallic foils 2 might arise from, for example, thermal expansion attendant on the temperature rise in the portion being welded. This wrinkling can be obviated, for example, as shown in FIG. 7 by applying TIG welding 14 to the capsule 1 at a welding position in the condition where the capsule 1 is clamped, at portions thereof near the welding position, from the upper and lower sides on a clamp device 13.

The TIG welding is a welding carried out, as shown in FIG. 5, by generating an arc 5G out of a nozzle 5D by a tungsten electrode 5E into a protective gas atmosphere comprising argon, helium or a mixed gas 5F thereof. The TIG welding is more economical than YAG laser welding or light beam welding. Further, the TIG welding enables lap welding of thin metallic foils 2 by applying a high-frequency pulse, for example, 20 kHz pulse.

Alternatively, the lap welding 11 is carried out by seam resistance welding means in which, as shown in FIGS. 6(1) and 6(2), metallic foils 2 are clamped between a pair of copper alloy rolls 5A, and welding is carried out under a welding force F of 50 kg and a welding speed of 1 m/min by supplying a welding current of 1050, 1150 or 1400 A or the like from a transformer 5C.

In the seam resistance welding, the rolls 5A serve as a jig, thereby offering an additional advantage.

Figure 8:
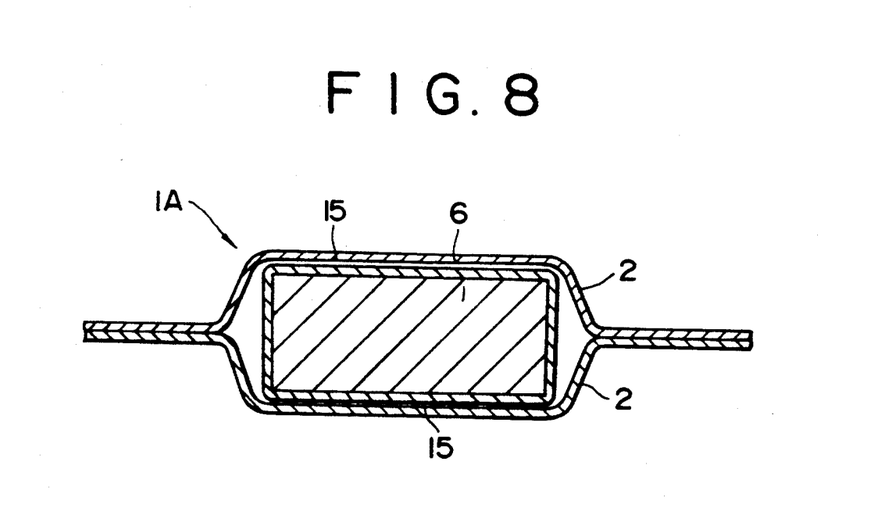
FIG. 8 is a sectional view showing the encapsulated condition of a material to be treated which is provided with a coating layer thereon.

When there is the possibility that an HIP treatment may cause the metallic foils 2 of the capsule 1 to adhere to the material 6 being treated, it is preferable that, as shown in FIG. 8, a coating layer 15 comprising a difficultly sinterable ceramic or the like is provided on the surfaces of the material 6 to be treated or on the inner surface of the capsule 1 by coating, flame spraying or the like. As an alternative to the coating layer 15, a ceramic paper or a ceramic plate may be disposed between the material 6 to be treated and the capsule 1. Also, a high-melting temperature such as tungsten, platinum, etc. which hardly reacts with the material 6 to be treated may be intermediately disposed, instead of the coating layer 15.

In order to keep clean the surfaces of the material 6 to be treated, it is preferable that a foil of zirconium, titanium or the like is contained in the capsule 1, together with the material 6 to be treated, at a suitable place as a getter of oxygen, nitrogen or the like.

Figure 9:
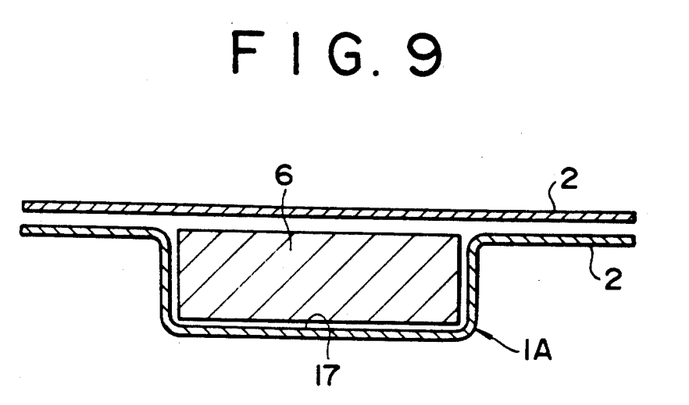
FIG. 9 is a sectional view of a capsule having a recessed portion for containing a material to be treated.
Figure 10:
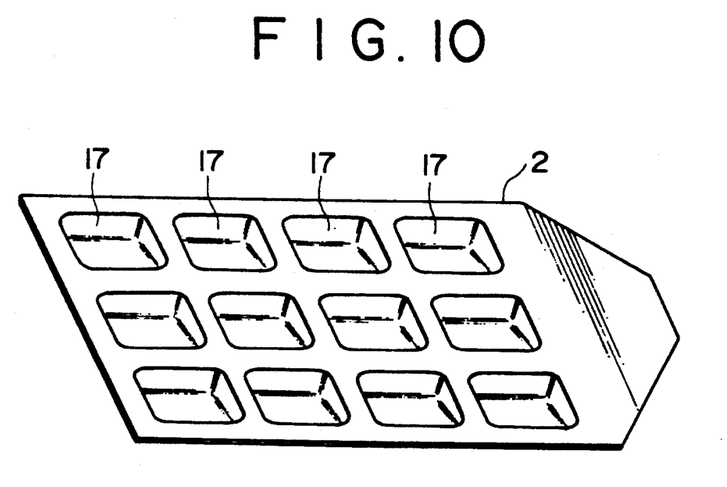
FIG. 10 is a perspective view of a metallic foil provided with a multiplicity of containing recessed portions.

In addition, where the thickness of the material 6 to be treated is 10 mm or above, the metallic foil 2 may be preliminarily subjected to press working or the like to form a containing recessed portion 17, as shown in FIG. 9, whereby the material 6 can be contained easily. Furthermore, in the case of encapsulating a multiplicity of small-sized molded bodies as materials 6 to be treated, the materials 6 to be treated may be contained respectively in a multiplicity of containing recessed portions 17 provided in a metallic foil 2, as shown in FIG. 10, and another metallic foil 2 may be superposed thereon, followed by seam welding along the periphery of the whole set of the materials 6, thereby forming a back-shaped capsule 1.

This invention will now be explained with reference to some specific embodiments thereof as follows.

Embodiment 1

Stainless steel (SUS 304) foils 2 with 100 μm thickness as blank materials were subjected to high-frequency pulse TIG welding under the conditions of a welding current of 6 A and a feed rate of 3 mm/sec, to produce a capsule 1 in an envelop-like form 350 mm wide and 500 mm long.

A material 6 to be treated was an alumina ceramic body which had preliminarily been subjected to primary sintering at 1400° C. under normal pressure, and had dimensions of 200×250×10 mm and a relative density of 85%.

The material 6 to be treated was placed into the bag-shaped body 1A through a charge port 3, and a tungsten foil with 50 μm thickness was placed in the gap between the bag-shaped body 1A and the material 6 for preventing reactions therebetween. A pipe 7 for evacuation, made of mild steel and being 10 mm in outside diameter and 8 mm in inside diameter, was inserted into the charge port 3, and attached to the port 3 gas-tight by soldering 8. A hose 10 of a vacuum pump was jointed to the pipe 7, and the bag-shaped body 1A was evacuated therethrough. When a vacuum of $10^{-2}$ Torr was attained, the portions of the metallic foil 2 between the material 6 to be treated and the pipe 7 were clamped as shown in FIG. 7, and subjected to lap welding 11 by application of high-frequency pulse TIG welding. Then, the metallic foils 2 thus welded were cut at position 12, to prepare a capsule 1 shown in FIG. 4.

The capsule 1 thus prepared, with the material 6 to be treated sealed therein with evacuation, was placed in an HIP system, and an HIP treatment was carried out under the conditions of 1300° C. and 1000 kgf/cm² for 1 hour. After the HIP treatment, the capsule 1 was cut by use of a pair of tinman's shears, and a sintered ceramic product was recovered. The alumina ceramic product thus obtained had a relative density of approximately 100% and dimensions of 190.4×236.8×9.5 mm, similar in shape to but contracted in size from the material 6 before the treatment.

Embodiment 2

Using stainless steel foils 50 μm thick as blank materials, a capsule 1 in an envelop-like shape 100 mm wide and 150 mm long was prepared by seam resistance welding. The welding was carried out under the conditions of a welding current of 1150 A, a welding force of 50 kg and a welding speed of 1 m/min. The material 6 to be treated was a superposed pair of a copper plate 80 mm square by 0.5 mm thick and a stainless steel plate of the same dimensions. The material 6 to be treated was placed into a bag-shaped body 1A through a charge port 3, and a zirconium foil was placed into the gap between the bag-shaped body and the material 6 in order to keep the inside of the capsule clean.

An aluminum pipe 7 for evacuation, 8 mm in outside diameter and 6 mm in inside diameter, was bonded gas-tight to the charge port 3 by an epoxy adhesive. After solidification of the adhesive was confirmed, a hose 10 of a vacuum pump was connected to the pipe 7, thereby evacuating the bag-shaped body 1A. When a vacuum of $10^{-1}$ Torr was attained, the portions of the metallic foils 2 between the material 6 to be treated and the pipe 7 were subjected to lap welding 11.

The capsule 1 with the material 6 to be treated thus sealed therein with evacuation was placed in an HIP system, and an HIP treatment was carried out at 1000° C. and 1000 kgf/cm² for 1 hour. When the capsule 1 was cut and the material 6 treated was taken out, the copper plate and the stainless steel were found diffusion-joined to each other satisfactorily.

According to the process of this invention, as described above, a capsule comprises a metallic foil having a small thickness of 30 to 300 μm and therefore shrinks uniformly, conforming to the shape of the material to be treated, at the time of hydrostatic pressing. Consequently, strains due to nonuniform shrinkage are not caused in the material being treated.

In addition, because the metallic foil can be cut easily by a pair of tinman's shears or the like and be stripped off easily from the material treated, it is easy to remove the capsule after the hydrostatic pressing treatment.

Also, since the metallic foils, with the material to be treated sandwiched therebetween, are brought into close contact with each other at portions along the periphery of the material to be treated and the close contact portions are welded to form a capsule, there is a high degree of freedom in the shape of the metallic foils suitable for the shape of the material to be treated. It is therefore unnecessary to make respective capsules for particular materials to be treated.

Further, because the metallic foils are brought into close contact with the material to be treated, it is also unnecessary to fill up the spaces around the material to be treated, with a secondary pressure medium.

Thus, according to the process of this invention, there is no possibility of the capsule being deformed unevenly under hydrostatic pressing to cause strains in the material being treated. Besides, the step of sealing the material to be treated in the capsule is simple, with good adaptability to complicated shapes of the material to be treated. The process according to this invention also makes it easy to take out the material treated by hydrostatic pressing, from the capsule, ensures an improved productivity, and is suitable for mass treatment of small-sized materials to be treated.

Furthermore, according to the process of this invention the lap welding is carried out by TIG welding or seam resistance welding, which is more economical than YAG laser welding, light beam welding, etc., and does not require a high-capacity power supply. The process of this invention can therefore be carried out with a compact apparatus.

A particular advantage of the use of TIG welding or seam resistance welding is that defects are hardly generated in the weld zone, as contrasted to the case of light beam welding where the simultaneous fusing and welding of the foils often leaves defects in the weld zone.

Moreover, the use of seam resistance welding has a further advantage in that the rollers serves as clamp means at the time of welding and that welding can be carried out also along the a circumferential direction.

What is claimed is:

1. A process for preparation of capsule for use in isostatic pressing treatment which comprises:
    a first step of enclosing a material to be treated with metallic foil having a thickness of from 30 to 300 μm, said material to be treated being covered with a ceramic or metal layer which prevents adhesion between the material to be treated and the metallic foil; and
    a second step of welding the metallic foil so as to seal the material to be treated in the metallic foil thus welded, thereby preparing a capsule, the welding being carried out by means of TIG welding.

2. A process for preparation of capsule for use in isostatic pressing treatment which comprises:
    a first step of enclosing a material to be treated with metallic foil having a thickness of from 30 to 300 μm, said material to be treated being covered with a ceramic or metal layer which prevents adhesion between the material to be treated and the metallic foil; and a second step of welding the metallic foil so as to seal the material to be treated in the metallic foil thus welded, thereby preparing a capsule, the welding being carried out by means of seam resistance welding.

3. The process of claim 1 wherein said first step comprises inserting the material into an existing metal foil.

4. The process of claim 2 wherein said first step comprises inserting the material into an existing metal foil.

5. The process of claim 3 including the further step of isostatically pressing the capsule.

6. The process of claim 4 including the further step of isostatically pressing the capsule.

* * * * *